(12) United States Patent
Röhm

(10) Patent No.: US 6,581,942 B2
(45) Date of Patent: *Jun. 24, 2003

(54) DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/887,869

(22) Filed: Jun. 22, 2001

(65) Prior Publication Data

US 2002/0000698 A1 Jan. 3, 2002

(30) Foreign Application Priority Data

Jul. 3, 2000 (EP) .............................................. 00113184
Mar. 26, 2001 (EP) .............................................. 01107531

(51) Int. Cl.⁷ ...................... B23B 31/12; B23B 31/10; B23B 31/02
(52) U.S. Cl. .......................... 279/62; 279/140; 279/902
(58) Field of Search ........................... 279/61, 62, 140, 279/902

(56) References Cited

U.S. PATENT DOCUMENTS

| | | | |
|---|---|---|---|
| 4,930,793 A | * | 6/1990 | Ando |
| 5,765,839 A | | 6/1998 | Rohm |
| 5,816,583 A | * | 10/1998 | Middleton |
| 5,829,761 A | | 11/1998 | Rohm |
| 6,217,033 B1 | * | 4/2001 | Sakamaki |
| 6,341,783 B1 | * | 1/2002 | Rohm |

FOREIGN PATENT DOCUMENTS

| | | |
|---|---|---|
| DE | 4419825 | 12/1995 |
| EP | 0598176 | 5/1994 |
| EP | 1029621 | 8/2000 |
| GB | 1584327 | 2/1981 |

* cited by examiner

*Primary Examiner*—Stephen Blau
(74) *Attorney, Agent, or Firm*—Herbert Dubno; Andrew Wilford

(57) ABSTRACT

A drill chuck has a body formed with an axially forwardly open tool-receiving recess and with a plurality of angled guides opening axially forward in the recess. Respective jaws axially and radially displaceable in the guides are each formed with a row of teeth. A tightening ring axially fixed but rotatable about the axis on the body has a screwthread meshing with the teeth so that rotation of the ring displaces the jaws in their guides. An adjustment sleeve is rotatable about the chuck axis on the body. The body has rearward of the tightening ring an outer surface directed toward an inner surface of the adjustment sleeve. Mechanism inside the adjustment sleeve couples the adjustment sleeve to the tightening ring. A support washer has an inner periphery axially fixed to the outer body surface and an outer periphery axially fixed to the inner adjustment-sleeve surface.

19 Claims, 16 Drawing Sheets

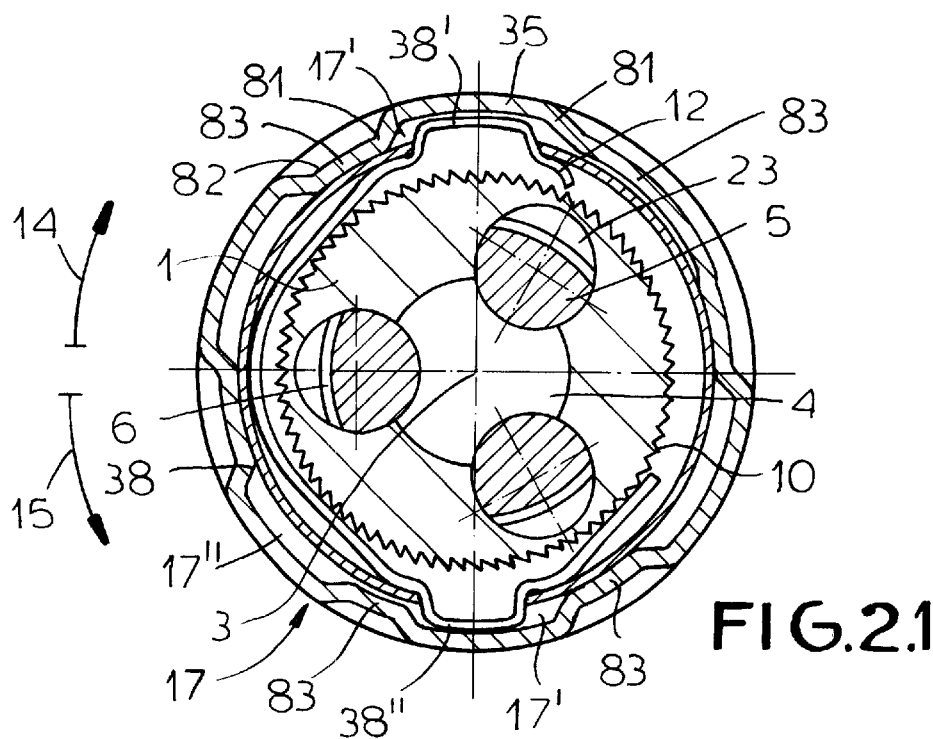
FIG.2.1
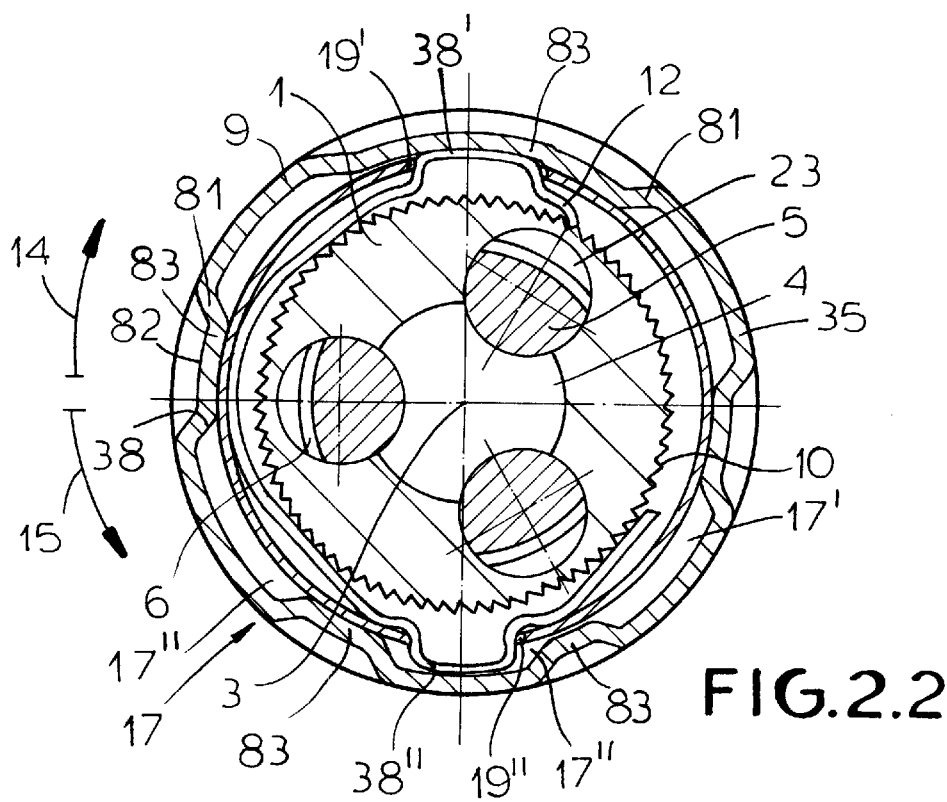
FIG.2.2

DRILL CHUCK

FIELD OF THE INVENTION

The present invention relates to a chuck. More particularly this invention concerns a locking drill chuck.

BACKGROUND OF THE INVENTION

As described in my U.S. Pat. No. 5,829,761, a drill chuck has a body centered on and rotatable about an axis and formed with a plurality of angled guides opening axially forward at a front chuck end and holding respective jaws each formed with a row of teeth. The rear end of the chuck has a formation, typically a threaded bore, centered on the axis and adapted to fit with a spindle or other rotating part of a drill unit, and the front end of the chuck has a similar bore or recess which receives the tool or workpiece being rotated and into which the jaws engage. A metallic tightening ring axially fixed but rotatable about the axis on the body has a screwthread meshing with the teeth of the jaws so that rotation of the tightening ring displaces the jaws in their guides. An adjustment sleeve rotatable about the axis on the body has a metal outer part and a plastic inner part fixed on the outer part. A metallic intermediate ring fixed to the tightening ring has formations rotationally coupled to the hard outer part. The inner part rides on the intermediate ring. Mechanism is provided in the chuck for locking the tightening ring against rotation relative to the body. This mechanism is operated by cam formations inside the plastic inner ring.

The hard, normally steel, outer sleeve part is resistant to damage during normal use so that if a wrench must be applied to it, for instance, it will not be ruined. Since the intermediate ring is coupled directly to this hard outer ring, no significant torque is transmitted by the plastic part and, therefore, the adjustment ring can be actuated forcibly without damage to it. On the other hand the inner part is made of plastic which can easily be formed, for instance by molding, to have a very complex shape so as to coact with the locking mechanism and ride smoothly on the metal intermediate ring.

Assembling such a chuck is often fairly complex in that the sleeve is typically secured axially at the front end of the chuck body. In addition drilling exerts force on the sleeve that subjects it to often excessive wear. The two-part adjustment sleeve is also expensive to manufacture, and often is of such thickness that it adds unnecessarily to the overall chuck diameter.

OBJECTS OF THE INVENTION

It is therefore an object of the present invention to provide an improved drill chuck.

Another object is the provision of such an improved drill chuck which overcomes the above-given disadvantages, that is which is simple and inexpensive to manufacture and where the adjustment sleeve is protected against excessive wear.

SUMMARY OF THE INVENTION

A drill chuck has according to the invention a body centered on and rotatable about an axis and formed with an axially forwardly open tool-receiving recess and with a plurality of angled guides opening axially forward in the recess. Respective jaws axially and radially displaceable in the guides are each formed with a row of teeth. A tightening ring axially fixed but rotatable about the axis on the body has a screwthread meshing with the teeth so that rotation of the ring displaces the jaws in their guides. An adjustment sleeve rotatable about the axis on the body extends axially forward and rearward of the ring. The body has rearward of the tightening ring an outer surface directed toward an inner surface of the adjustment sleeve. Mechanism inside the adjustment sleeve couples the adjustment sleeve to the tightening ring. A support washer has an inner periphery axially fixed to the outer surface of the body and an outer periphery axially fixed to the inner surface of the adjustment sleeve. One of the peripheries is movable angularly relative to the respective surface.

Thus with this arrangement the adjustment sleeve is connected to the chuck body at the rear half of the chuck, rearward of the tightening ring. Hence many of the problems caused by attaching this sleeve at the front end of the chuck are avoided. Assembly of the chuck is simplified in that the sleeve can be slipped from the front over the chuck body and secured in place once in position. The front and middle regions of the chuck are not used for securing the adjustment sleeve in place, making these areas available for other purposes. The support washer according to the invention is axially somewhat elastically deformable, making the chuck much less susceptible to harm during normal use and more comfortable to use. Another advantage is that, when using the drill-unit motor to reverse rotate the chuck body to open the chuck while gripping the adjustment sleeve, the tendency to jam the jaws on the tightening ring is reduced by the springiness of the support washer.

According to the invention the body is further formed with an axially rearwardly open drive hole. In addition the adjustment-sleeve inner surface is formed with radially inwardly open groove receiving the washer outer periphery. The chuck has a rear end and the washer is at the rear end, spaced rearward from the ring.

The outer periphery of the washer can be is axially offset from the inner periphery. In addition the one periphery can be formed with a plurality of radially deflectable tabs. Normally the one periphery is the outer periphery and the inner surface is formed with the radially inwardly open groove in which the tabs engage. The washer is formed with axially throughgoing apertures facilitating elastic deflection of the tabs. These apertures also allow particles or grit to exit the chuck, rather than staying inside it where they would cause wear.

According to the invention the mechanism includes a locking element displaceable between an unlocked position permitting the adjustment sleeve to rotate in opposite directions about the axis relative to the body and a locked position preventing rotation of the adjustment sleeve in one of the directions relative to the body. When locked, the chuck can be tightened but not loosened. To this end the mechanism includes a cam formation on the adjustment sleeve displacing the locking element between the locked and unlocked positions. The adjustment sleeve is formed of metal of a uniform wall thickness and is formed with inwardly directed bumps or pockets forming the cam formation. Thus a shaped plastic liner is not needed, and the pockets make the surface readily grippable for use in a manually, not key-operated, chuck.

The locking system includes a coupling sleeve between the adjustment sleeve and the body, formations angularly coupling the coupling sleeve to the adjustment sleeve, the locking element angularly fixed to the coupling sleeve, and an array of teeth formed on the tightening ring and engageable with the locking element. The coupling formations include an axially extending relatively narrow finger formed on the coupling sleeve and an axially open relatively wide notch formed on the adjustment sleeve and receiving the finger. The finger is angularly limitedly displaceable in the notch. In addition the formations include an outwardly projecting spring-loaded bump on the coupling sleeve and an inwardly projecting bump on the adjustment sleeve angularly engageable and slidable past the coupling-sleeve bump. In the locked position the coupling-sleeve bump is to one side of the adjustment-sleeve bump and in the unlocked position the coupling-sleeve bump is to an opposite side of the adjustment-sleeve bump. A spring element fixed angularly to the coupling sleeve forms the coupling-sleeve bump. Another or the same spring element fixed angularly to the coupling sleeve forms the locking element.

The washer according to the invention is formed with radially extending stiffening ribs. In addition the inner surface is formed with a groove and the washer includes a snap ring set in the groove and axially engaging the outer periphery. The outer periphery is formed with a plurality of axially forwardly projecting and independently radially deflectable tabs having ends forming the outer periphery.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 2.1 is a section along line II—II of FIG. 1 showing the chuck in the unlocked condition;

FIG. 2.2 is a view like FIG. 2.1 but with the chuck in the locked position;

SPECIFIC DESCRIPTION

Figure 1:
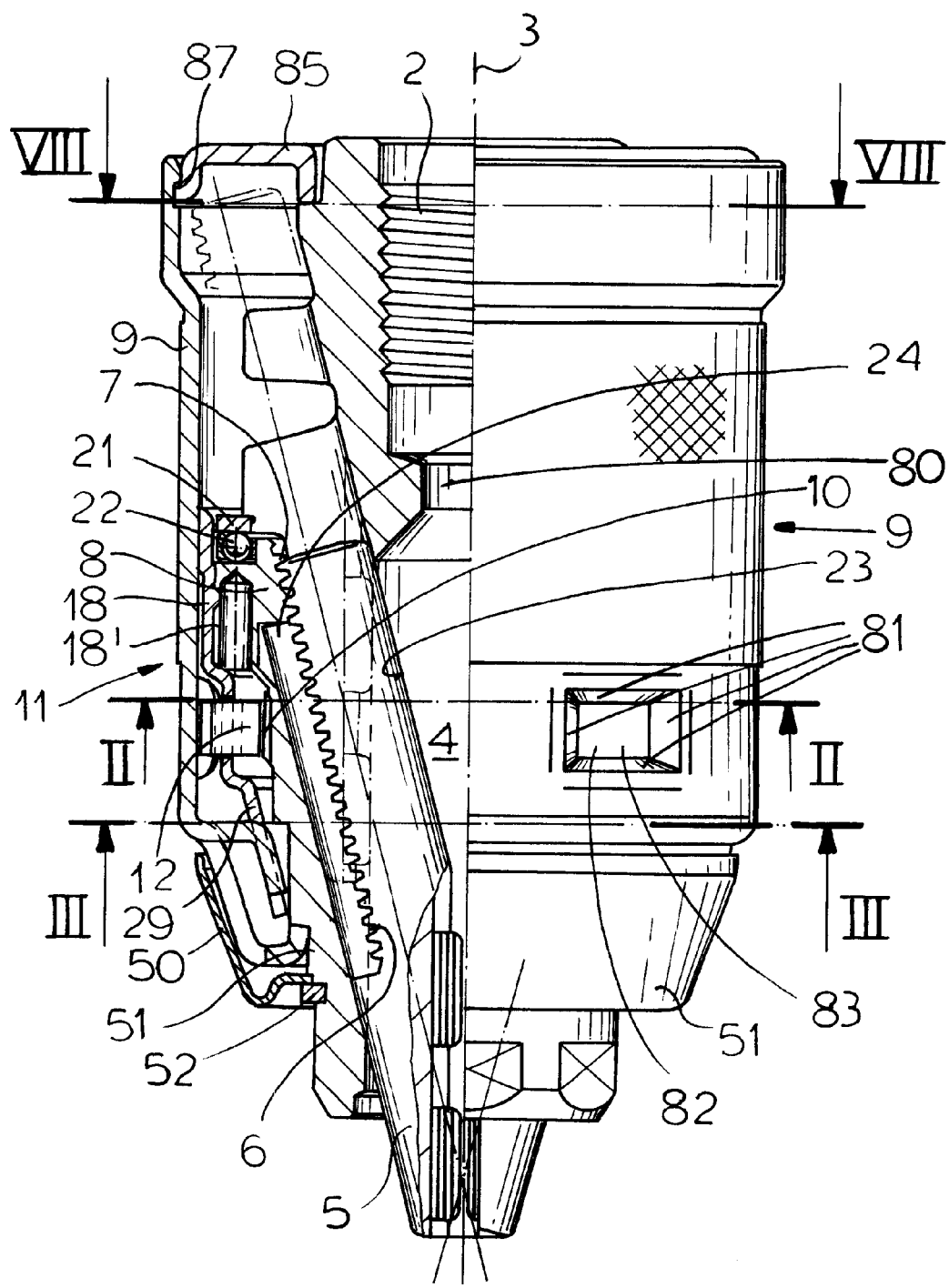
FIG. 1 is a side view partly in axial section through a chuck according to the invention.
Figure 3:
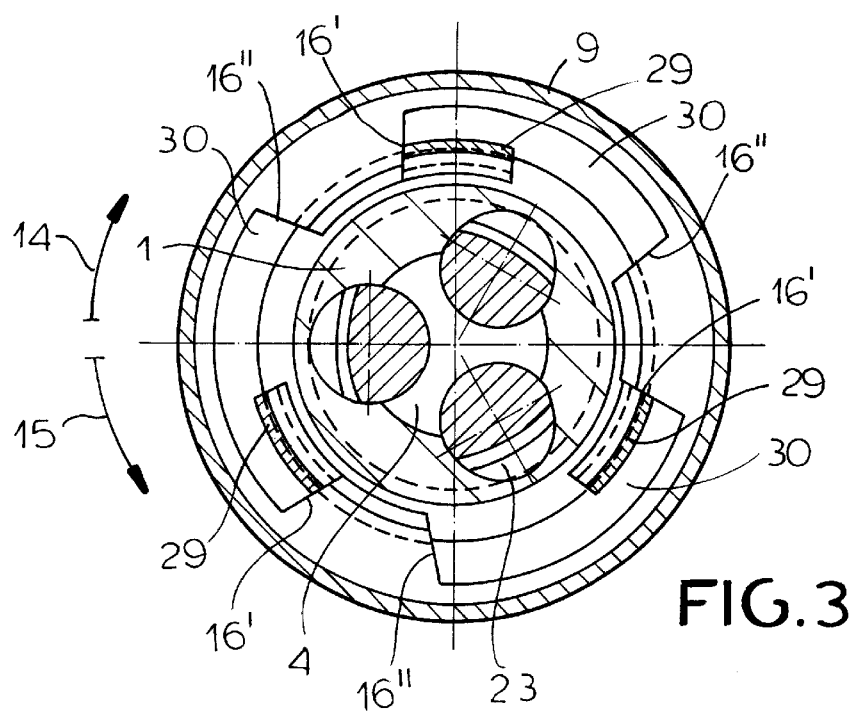
FIG. 3 is a section taken along line III—III of FIG. 1.

As seen in FIGS. 1, 2.1, 2.2, 3, and 8 a chuck according to the invention has a body 1 formed with a rearwardly open threaded hole 2 adapted to be mounted on the spindle of a drill unit for rotation of the chuck about an axis 3 on which the chuck is centered. The body 1 is further formed with an axially forwardly open tool-receiving recess 4 communicating with the hole 2 via a passage 80 so that a hammer rod can act directly on a tool in the recess 4. Three angularly equispaced jaws 5 are carried in angled guide passages 23 formed in the body 1 and have outer edges formed with teeth 6 that mesh with a screwthread 7 of a metallic tightening ring 8 that is axially fixed but rotatable on the body 1, bearing rearward on the body 1 via a washer 21 and roller bearing 22 and forwardly confined by a shoulder.

An adjustment sleeve 9 is formed of a single metallic part of uniform wall thickness normally shaped by stamping with a plurality of pockets 83 forming an internal cam surface 35 and formed at its front end with a plurality of radially inwardly open notches 30 having flanks 16' and 16". This adjustment sleeve 9, which can normally rotate in a loosening direction 14 and a tightening direction 15 on the body 1, is connected via a coupling 17 to the ring 8, but this coupling 17 has a lost motion so the sleeve 9 can move relative to a coupling sleeve 18 fixed to the ring 8 through a small angle between the unlocked position of FIG. 2.1 and the locked position of FIG. 2.2. The coupling 17 comprises a spring-steel strip 38 that can transmit limited torque to the ring 8 and tongues 29 on the coupling sleeve 18 engaging in the notches 30 of the adjustment sleeve 9 so they can transmit much greater torque. The outer surface of the sleeve 9 is milled as illustrated to provide a solid grip.

The sleeve 18 is annularly continuous and has a cylindrical rear end 18' that snugly surrounds and is force-fitted to the ring 8 which itself is made as two semicircular pieces for ease of assembly of the chuck. In practice a ring 8 is made of one piece, then drilled through axially at two diametrally opposite locations, and then broken in half to form two perfectly matched parts that, when fitted together, act as a single part.

The sleeve 9 forms the cam 35 that can coact with an element 12 of a locking system 11 to move this locking element 12 radially between the outer unlocked position of FIG. 2.1 in which it is out of engagement with the teeth 10 and an inner locked position shown in FIG. 2.2 in which it engages the teeth 10 and prevents rotation of the sleeve 9 and ring 8 in the loosening direction 14 relative to the body 1. Movement between these end positions is possible because the sleeve 9 can rotate through a predetermined angular distance relative to the sleeve 18 as the tongues 29 formed on the outer part 13 move between the end flanks 16' and 16" of the slots 30 of the sleeve 9.

More particularly the locking element 12 is formed at an end of the shaped spring-steel strip 38 forming part of the coupling 17 and having a pair of radially outwardly projecting bumps 38' and 38" diametrally opposite each other and engaging through respective windows 19' and 19" in the sleeve 18 so that the strip 38 is rotationally coupled to the sleeve 18. The inwardly projecting bumps 83 formed in the sleeve 9 have floors 82 and flanks 81 that form the cam 35 and that define radially inwardly open pockets 17' in which the bumps 18' and 18" engage in the unlocked position shown in FIG. 2.1. When engaged in these pockets 17' the toothed end of the strip 38 forming the locking element 12 is out of engagement with the teeth 10, allowing the body 1 to rotate in both directions 14 and 15 relative to the sleeve 18. When, however, the sleeve 9 is pivoted relative to the body 1 through a small angle, the bump 38' moves out of its pocket 17' and is pressed inward by the floor 82 to press the locking element 12 into the teeth 10, and the bump 38" moves into an adjacent retaining pocket 17" where it stops. In this locking position the sleeve 9 can only rotate in the tightening direction 15 relative to the body 1 with sliding of the locking element 12 on the angled back flanks of the teeth 10. Opposite rotation in the loosening direction 14 is impossible because the locking element 12 catches on the steep flanks of the teeth 10 which are directed angularly in the tightening direction 15.

Figure 8:
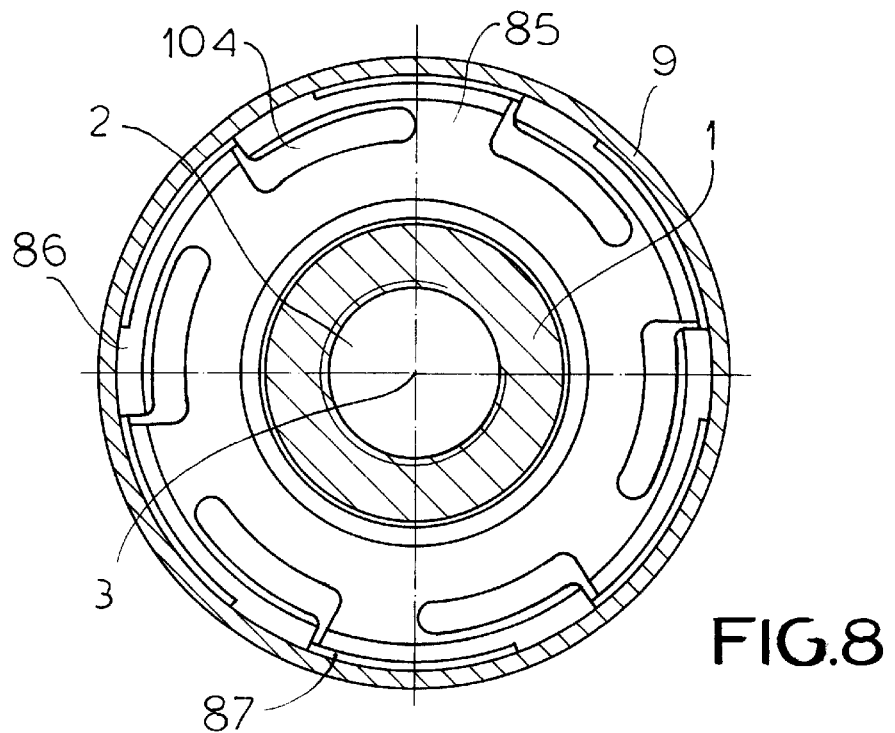
FIG. 8 is a section taken along line VIII—VIII of FIG. 1.

At its rear end the sleeve 9 is retained axially on the chuck body 1 by a support ring or washer 85 having as shown in FIG. 8 a plurality of radially deflectable fingers or tabs 86 engaged in a radially inwardly open groove 87 formed in the rear end of the sleeve 9. This washer 85 has an inner periphery force-fitted over the rear end of the body 1 so as to axially lock the sleeve 9 to the body 1 while still permitting it to rotate freely thereon about the axis 3. The front end of the sleeve 9 fits with minor play around the front end of the chuck body 1 so as to axially center it while still permitting free relative rotation.

The front end of the body 1 is formed with a radially outwardly open groove 51 in which a snap ring 52 retains an annular shield cup 50 that extends frustoconically back with spacing around the front end of the sleeve 9 and that can rotate on the body 1. Thus this shield 50 that is symmetrical to the axis 3 will itself contact any workpiece the chuck bumps into, preventing contact of the sleeve 9 with any such workpiece. The connection formed at the washer 85 therefore need not be designed to withstand substantial axial forces. During normal drilling, which is in the tightening direction 15, any engagement of the sleeve 9 with the workpiece, for instance, would tend to rotate it in the tightening direction 15 and overtighten the chuck.

The chuck is therefore operated, presuming the jaws 5 are retracted back in the body 1 and the parts are in the FIG. 2.1 unlocked position, by rotating the sleeve 9 in the tightening direction 15 while the body 1 is arrested, typically because it is held on a stationary drill-unit spindle seated in the hole 2. The initial angular displacement of the sleeve 9 will not be resisted by any significant force so it will be transmitted via the spring strip 38 from the adjustment sleeve 9 to the coupling sleeve 18 and thence to the ring 8 fixed angularly to it, rotating the ring 8 in a direction to slide the jaws 5 forward in the front tool recess 4.

Once the jaws 5 engage a tool or workpiece, their axial forward and radial inward advance will be resisted, as will rotation of the ring 8 and sleeve 18. The coupling 17 will let the sleeve 9 rotate relative to the sleeve 18 to move into the locked position of FIG. 2.2 and push in the locking element 12 to engage the teeth 10, while simultaneously pressing the tongues 29 against the flanks 16' of the notches 30, solidly angularly coupling the sleeve 9 to the sleeve 18 and therethrough to the ring 8. Further rotation of the sleeve 9 will cause the locking element 12 to ratchet on the teeth 10 as the ring 8 screws the jaws 5 tight to the workpiece until the sleeve 9 can be rotated no more in the tightening direction 14. Angular force below a certain level exerted on the sleeve 9 in the loosening direction 14 will not reverse rotate the sleeve 9 and ring 8 because of engagement of the locking element 12 with the teeth 10.

To loosen the chuck, the user forcibly rotates the sleeve 9 in the loosening direction 14 to first displace this sleeve 9 relative to the sleeve 18 so its bumps 38' and 38" can pop out into the pockets 17' and allow the locking element 12 to disengage from the teeth 10, while simultaneously bringing the tongues 29 into engagement with the opposite flanks 16" of the notches 30. As the sleeve 18 is no longer locked by the locking system 11 relative to the body 1 against rotation in the loosening direction 14, further rotation of the sleeve 9 in the loosening direction 14 therefore rotates the ring 8 and retracts the jaws 5.

Figure 4:
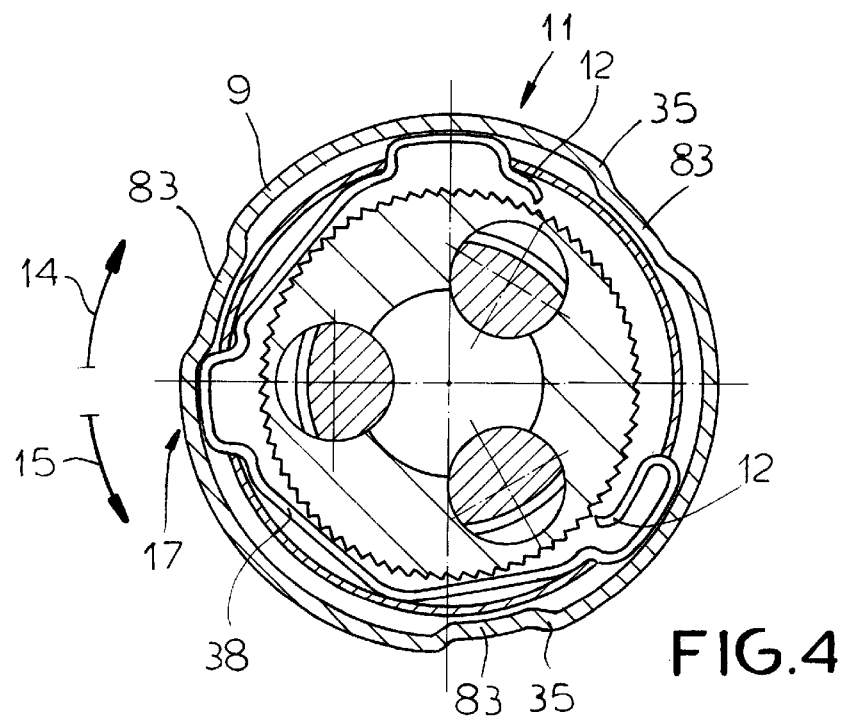
FIG. 4 is a view like FIG. 2.1 of an alternative system in accordance with the invention.

FIG. 4 shows an arrangement where the strip 38 has two ends each forming a locking element 12, one of the ends being looped back so the element 12 is directed in the loosening direction 14 as shown in the lower right. This redundancy ensures more solid gripping in the locked position, something particularly useful in auto-stop systems. Here each cam bump 38' or 38" is associated with a respective cam formation 83 of the sleeve 9. While a single strip 38 here, as in FIGS. 17, 21, and 22, forms several locking elements 12, FIGS. 17 through 22 show multiple separate strips 18 each forming a respective element 12.

Figure 5:
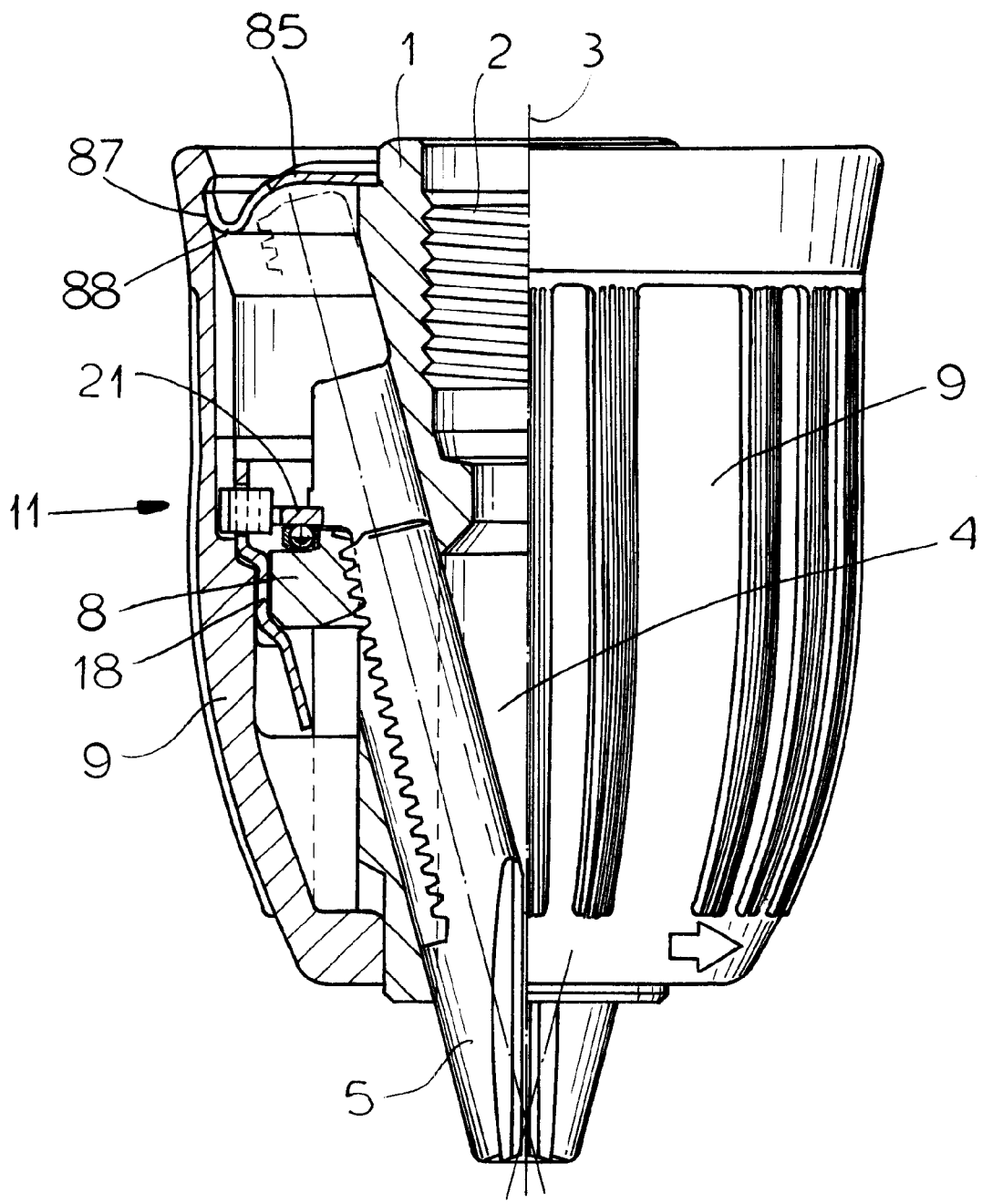
FIGS. 5 and 6 are views like FIG. 1 of further chucks according to the invention.
Figure 6:
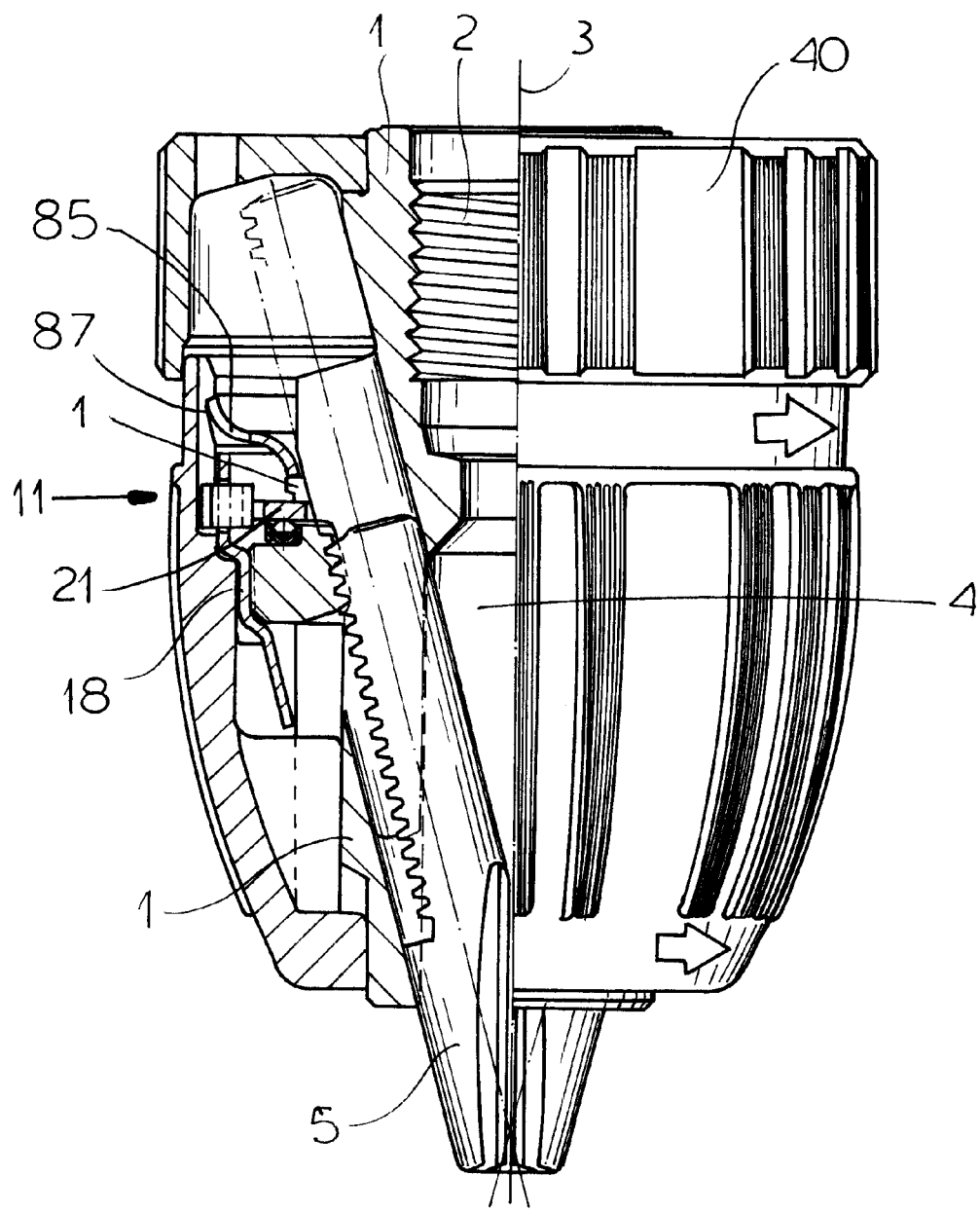

In FIG. 5 the support washer 85 has a plurality of axially rearwardly bent tabs 88 engaged in the groove 87. In FIG. 6 this washer 85 is set down in the chuck immediately above the bearing 22. Neither system has an axially effective connection at the front end of the chuck.

Figure 7:
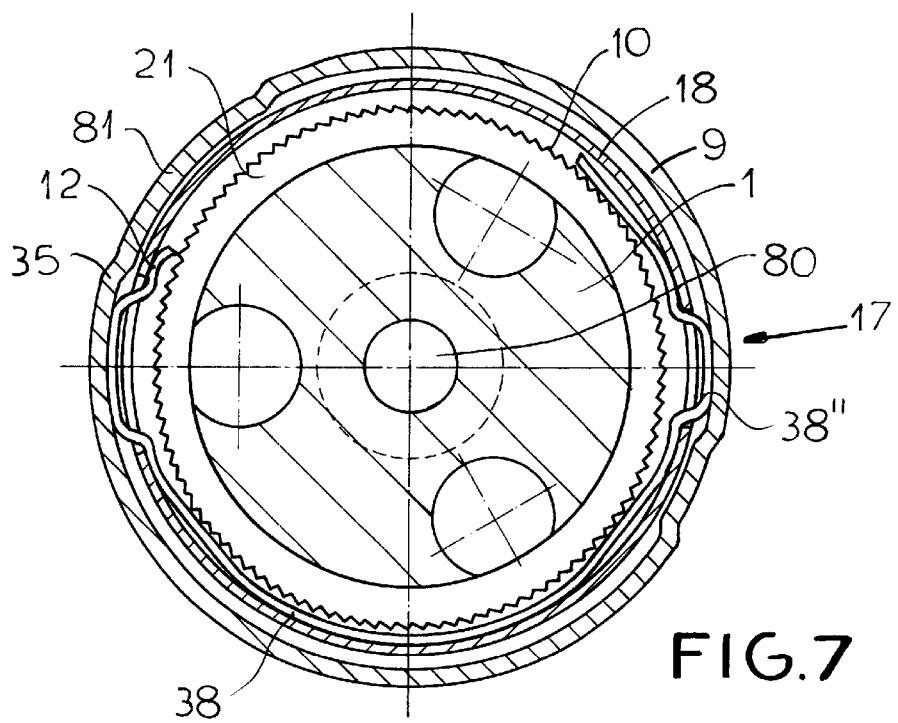
FIG. 7 is a view like FIG. 2.1 of yet another system in accordance with the invention.

The system of FIG. 7 has a one-piece spring element 83 forming both the lock system 11 and coupling 17, as in FIG. 1.

Figure 10:
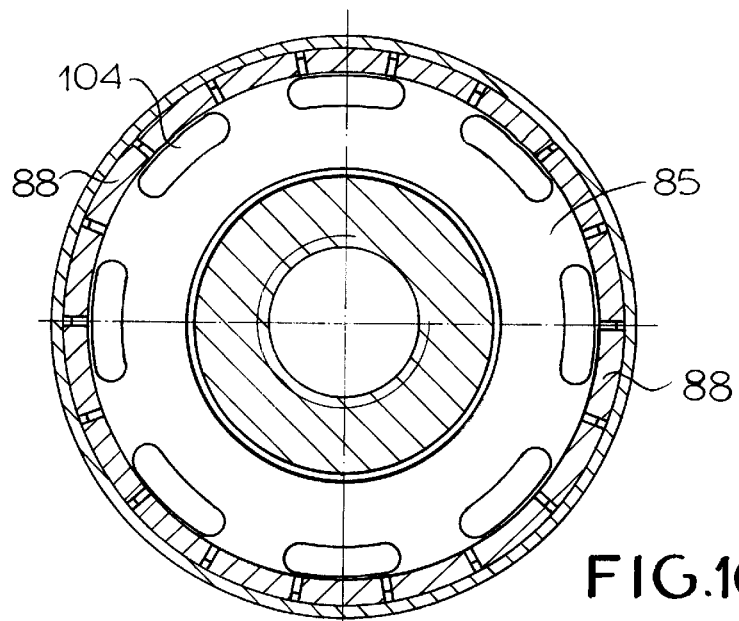
FIG. 10 is a section taken along line X—X of FIG. 9.
Figure 9:
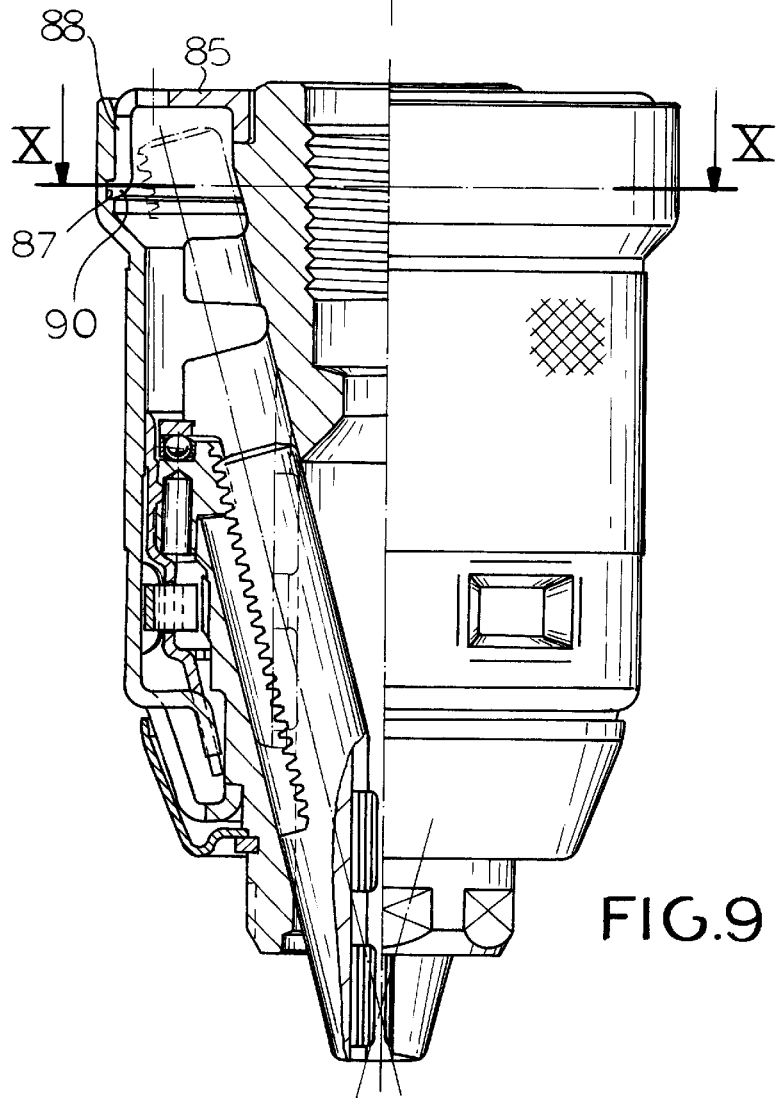
FIG. 9 is a view like FIG. 1 of another chuck according to the invention.

FIGS. 9 and 10 show a support washer 85 whose tabs 88 are separated by slots 90. In addition the washer 85 is formed with apertures or holes 104 facilitating bending of the tabs 88, and allowing particles generated by a drilling operation to fall out of the rear end of the chuck.

Figure 11:
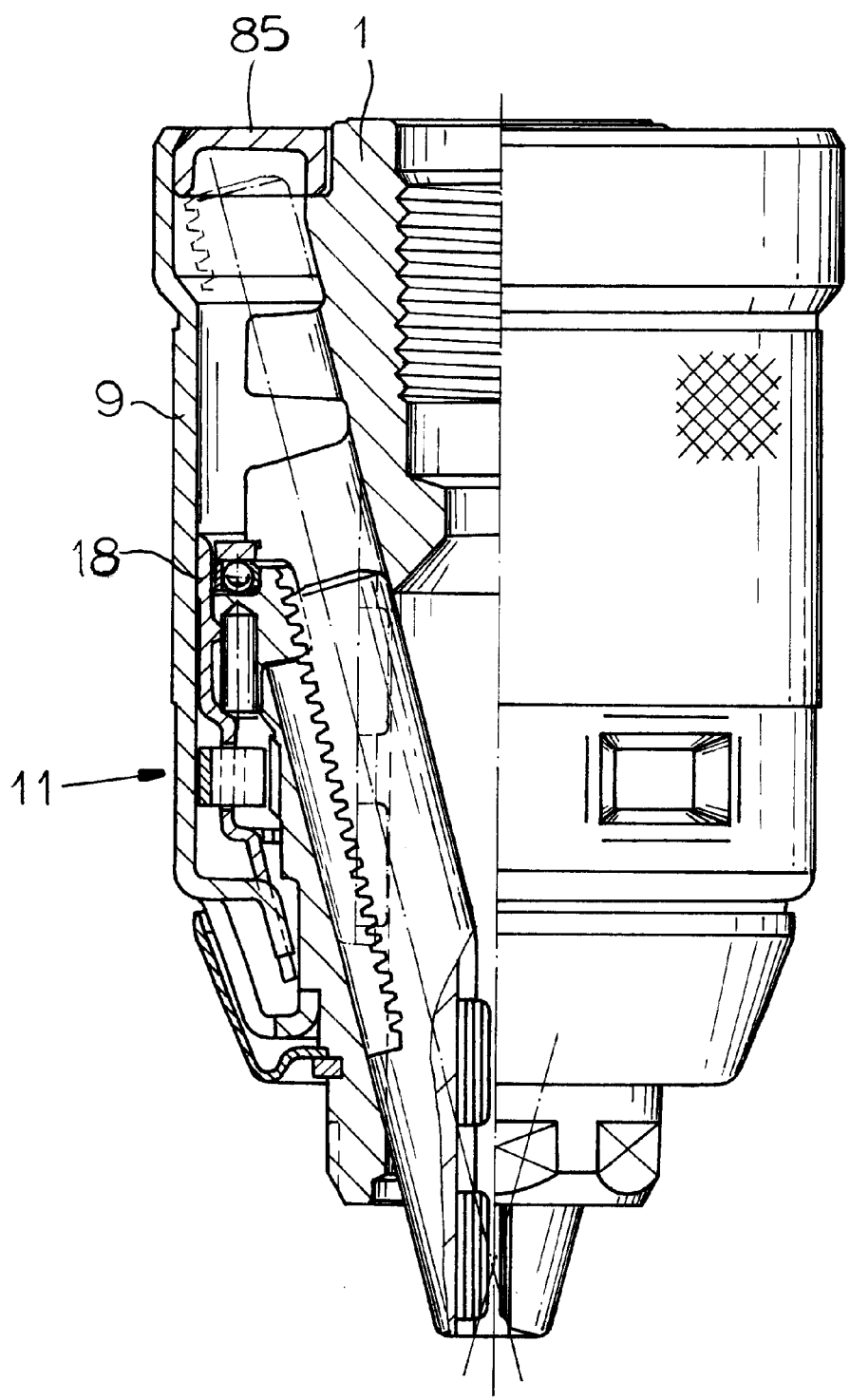
FIGS. 11 and 12 are views like FIG. 1 of other chucks according to the invention.

In FIG. 11 the washer 85 is a tight force-fit in the rear end of the sleeve 9 so that it rotates therewith and relative to the body 1. Since the front end of the sleeve 9 is of smaller diameter than the middle and rear end of the chuck body 1, once the rear sleeve end is crimped over the washer 85, the chuck is solidly assembled.

Figure 12:
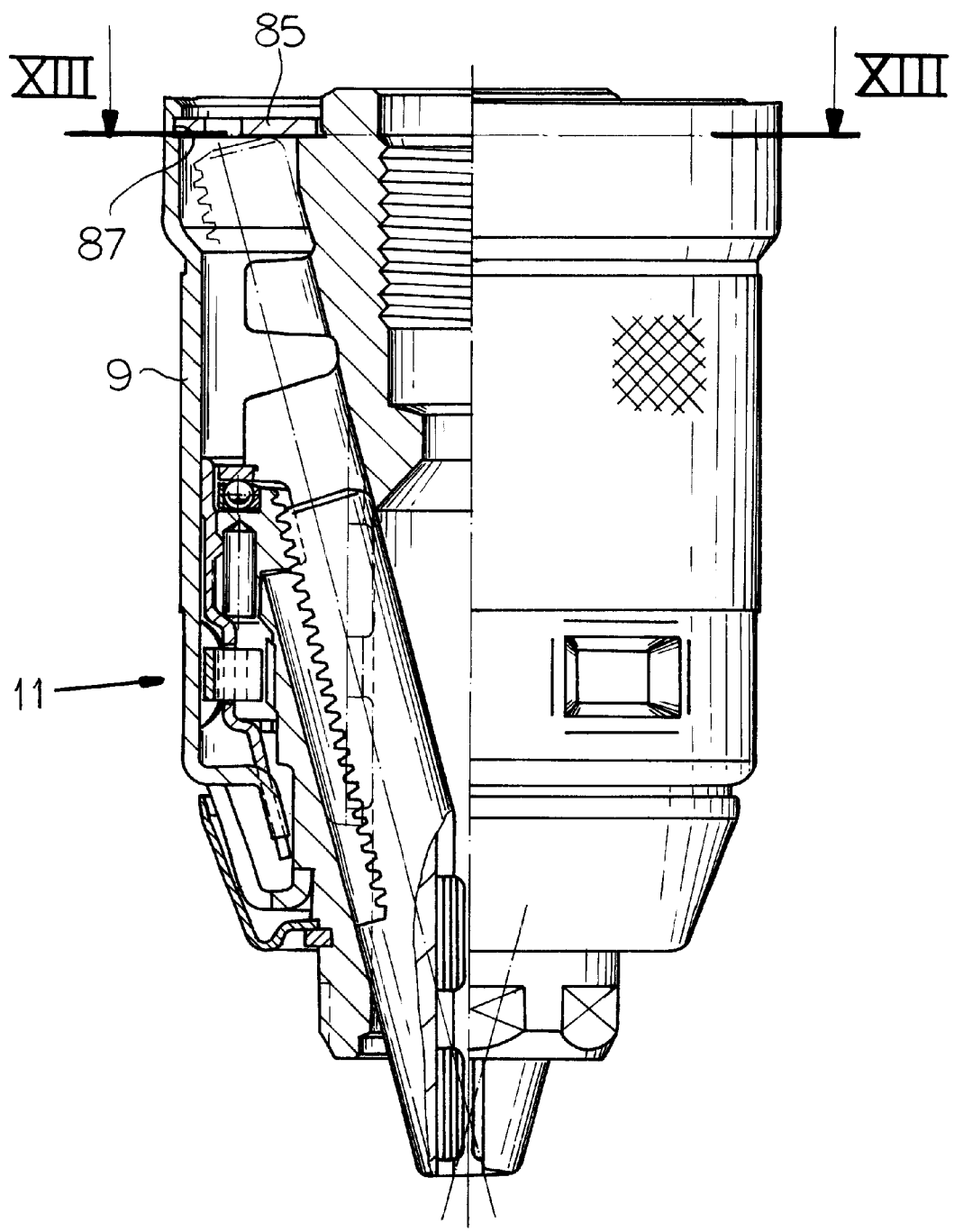
Figure 13:
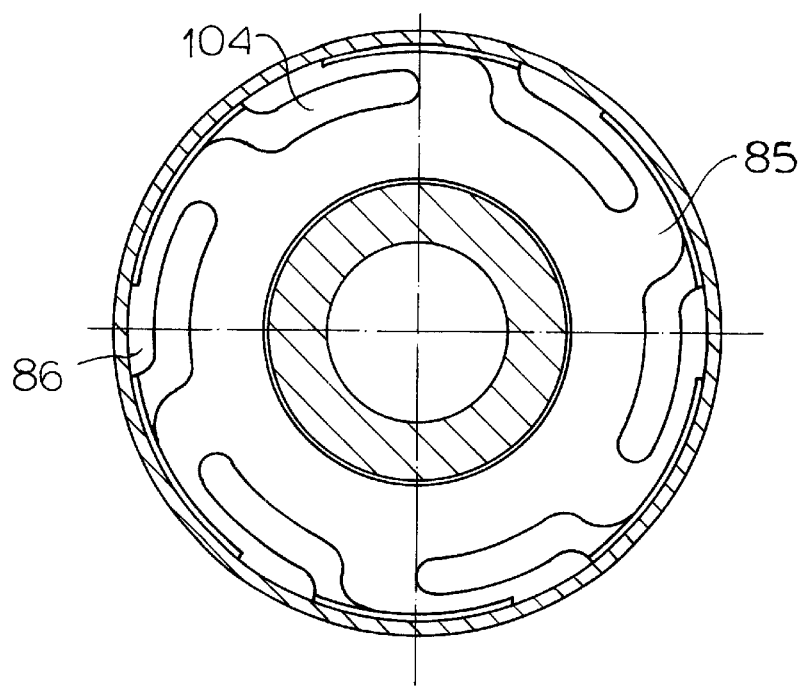
FIG. 13 is a section taken along line XIII—XIII of FIG. 12.

The chuck of FIGS. 12 and 13 has a planar support washer 85. The openings 104 are formed as slots to facilitate bending of the tabs 86.

Figure 14:
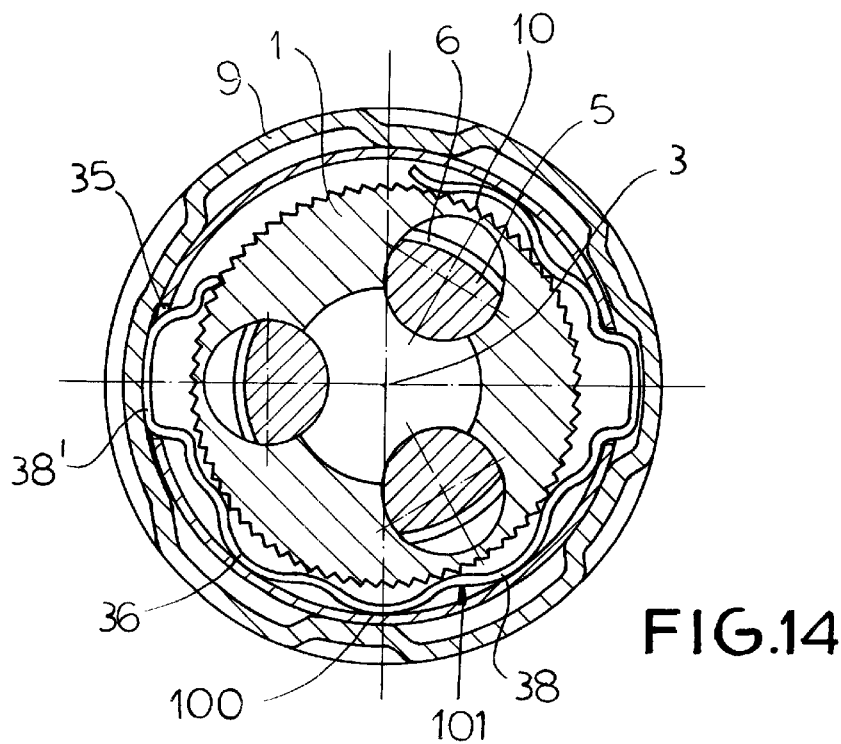
FIGS. 14, 15, 16, 17, 18, 19, 20, 21, and 22 are views like FIG. 2.2 of further variants on the lock mechanism of the instant invention, in the locked position.
Figure 15:
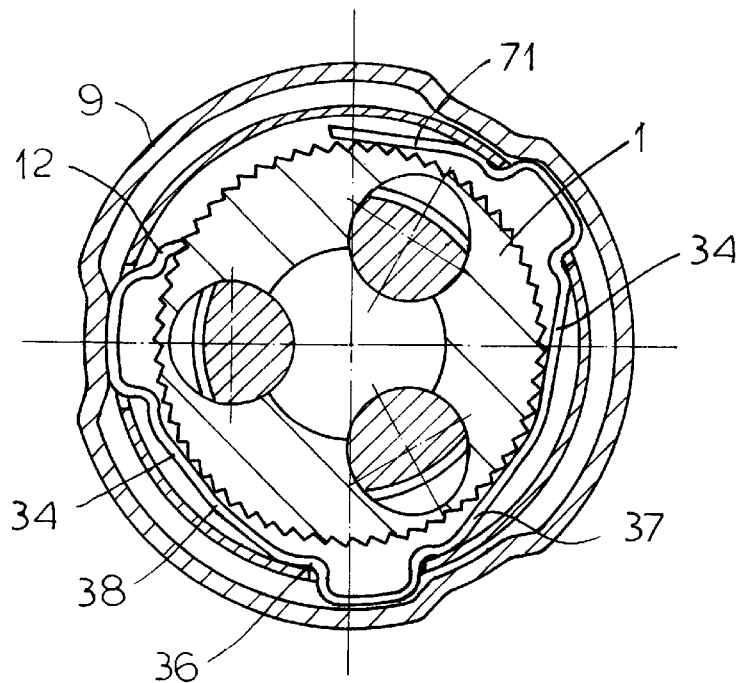

FIG. 14 shows a wavy spring element 38 having bumps 36 that bear on both the coupling sleeve 18 and body 1 to frictionally interconnect the two and prevent relative angular movement from minor forces, as for instance caused by vibration during drilling. In FIG. 15 an end 71 and central portions 37 and 34 bear inward on the chuck body 1 and regions 36 bear outward for a similar spring effect.

Figure 16:
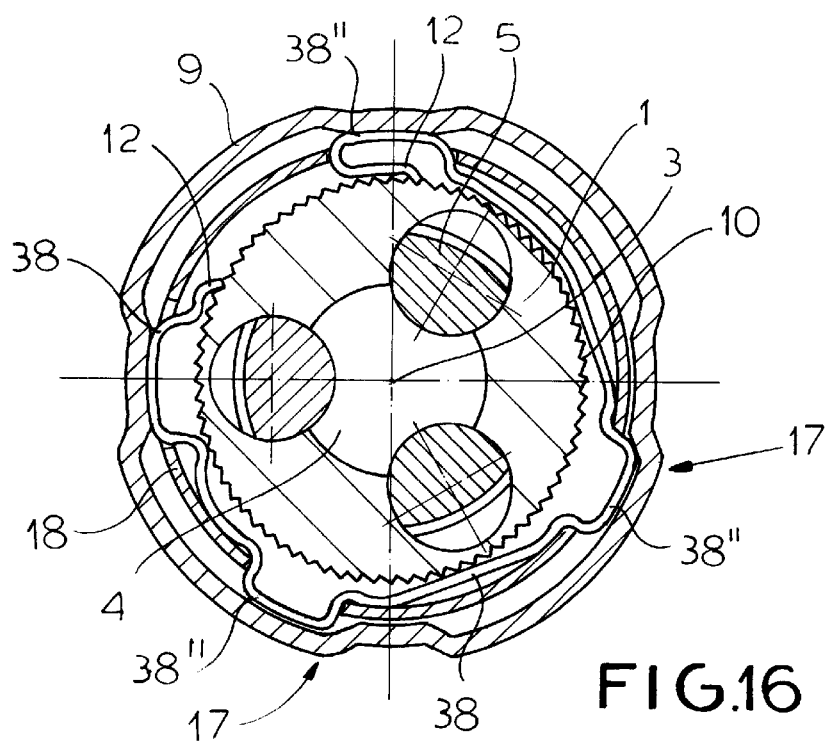
Figure 17:
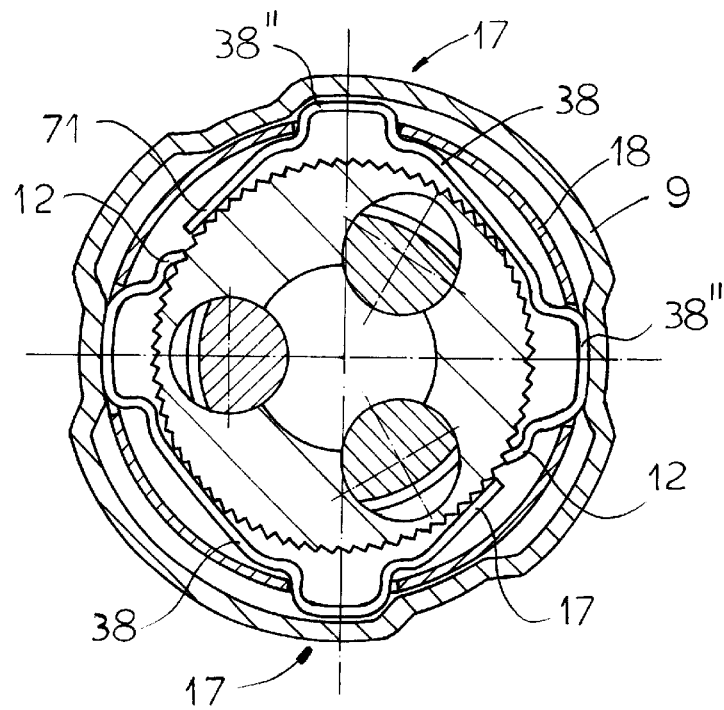
Figure 18:
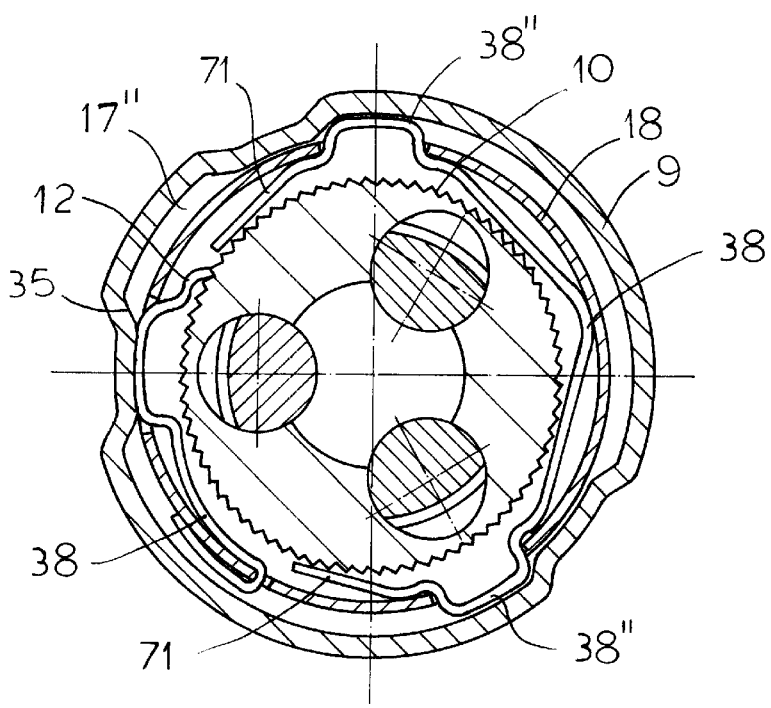
Figure 19:
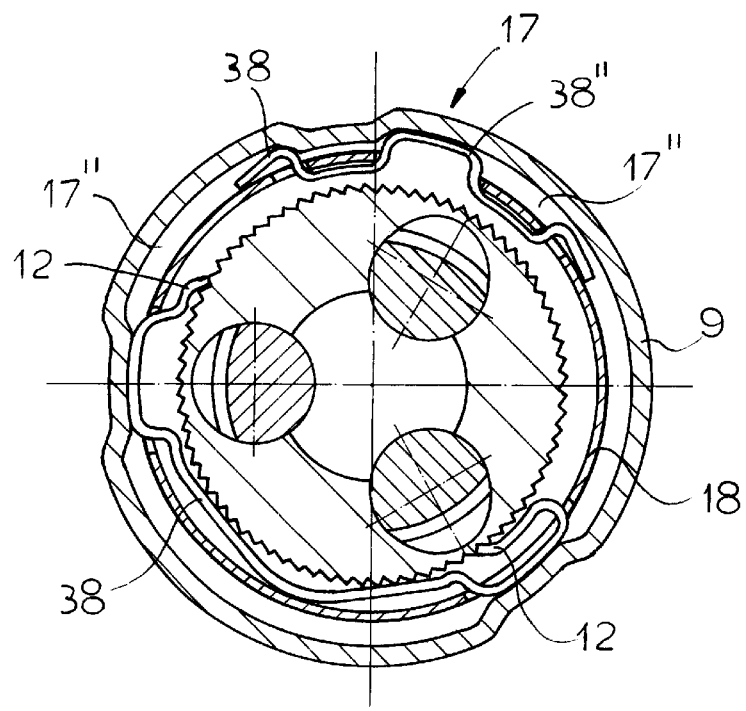
Figure 20:
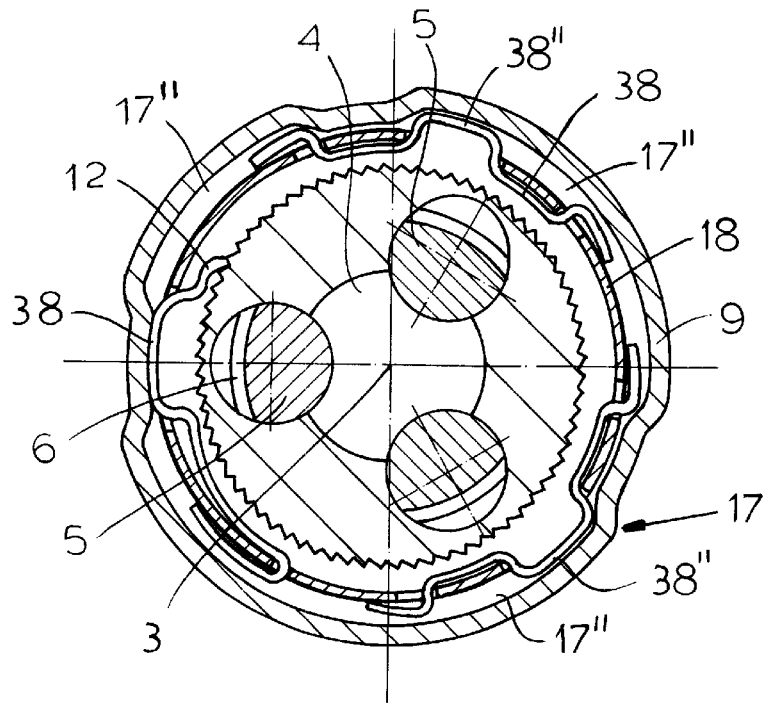
Figure 21:
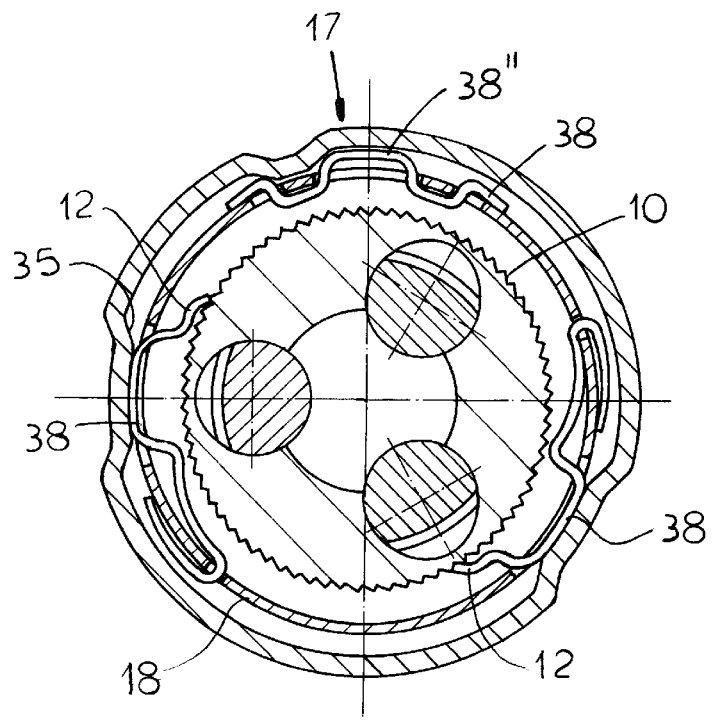
Figure 22:
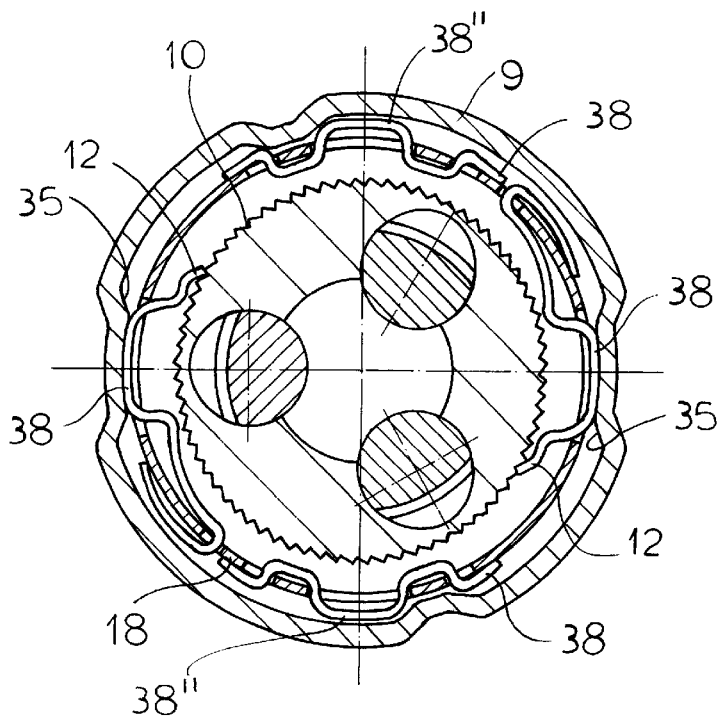

The system of FIG. 16 has two locking elements 12 formed at opposite ends of the spring element 38, two element-actuating bumps 38' and two retaining bumps 38". The arrangements of FIGS. 17 and 18 have two spring elements 38, each forming a respective coupling 17 and locking element 12. FIG. 19 has one element 38 forming the coupling 17 and the other element 38 forming two elements 12. FIG. 20 has two elements 38 forming couplings 17 and one forming a single locking element 12. FIG. 21 has two elements 38 forming locking elements 12 and one forming a coupling 17. In FIG. 22 two elements 38 form locking elements 12 and two more form couplings 17.

Figure 23:
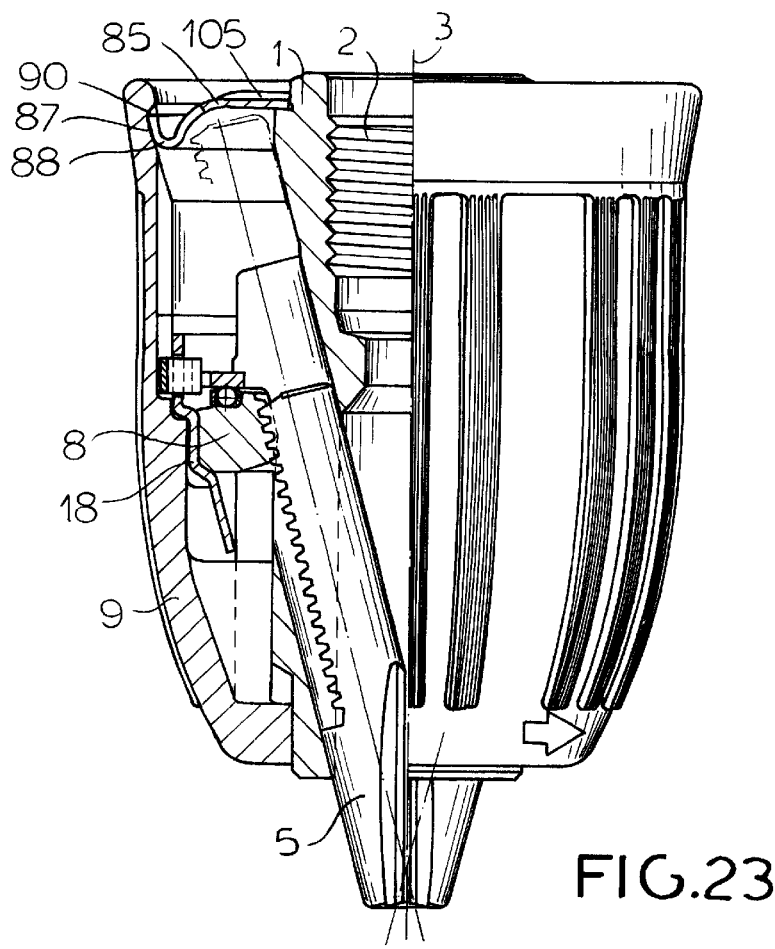
FIG. 23 is a view like FIG. 1 of another chuck according to the invention.
Figure 24:
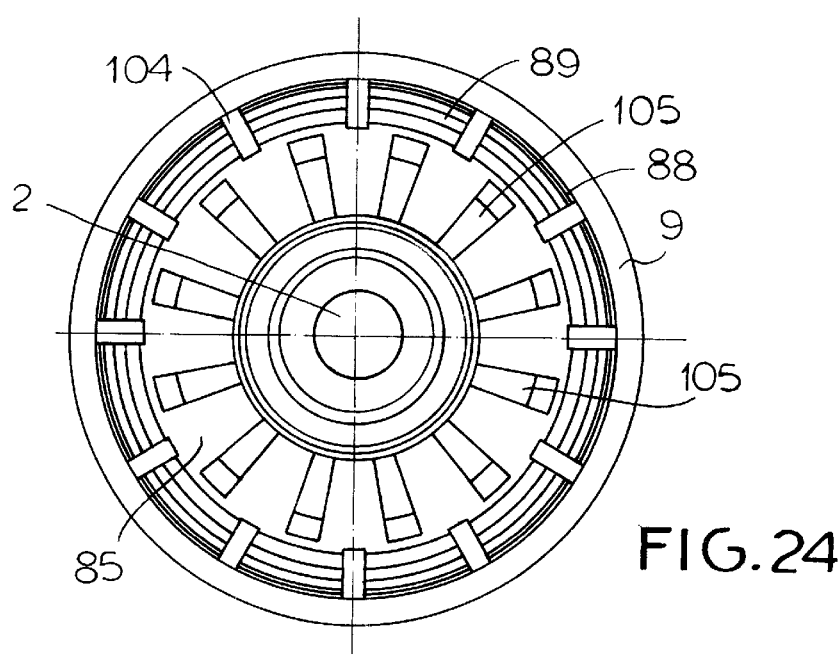
FIG. 24 is a top end view of the chuck of FIG. 23.
Figure 25:
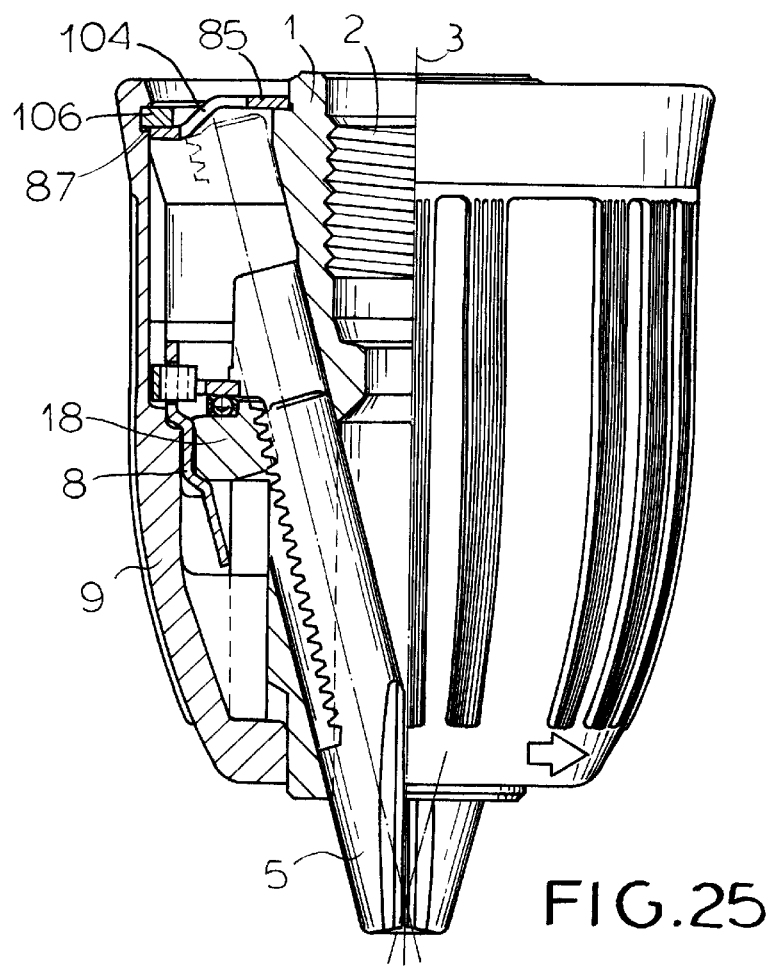
FIG. 25 is a view like FIG. 1 of another chuck according to the invention.
Figure 26:
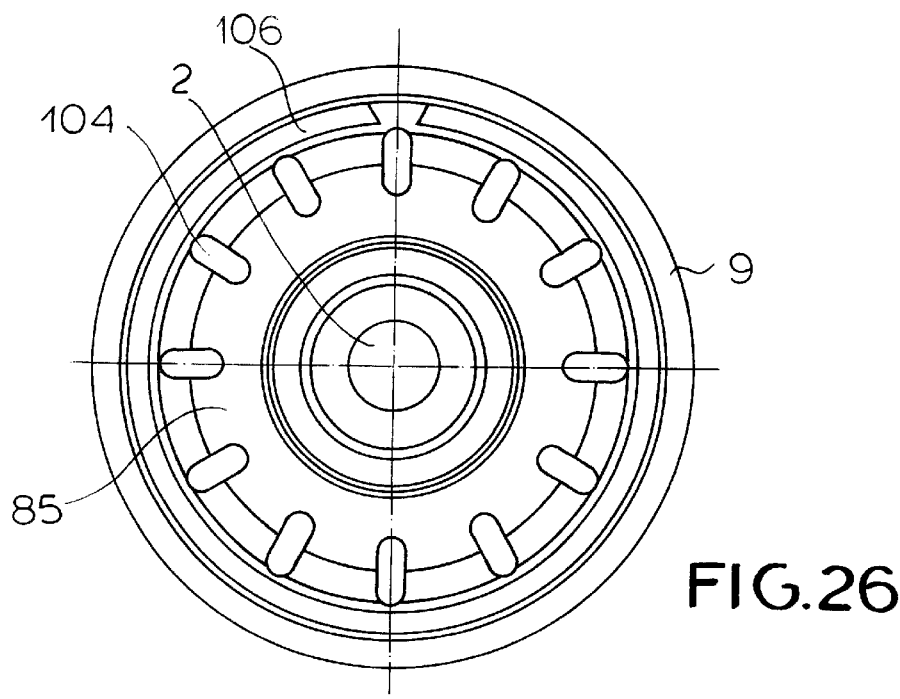
FIG. 26 is a top end view of the chuck of FIG. 25.

The chuck of FIGS. 23 and 24 is substantially identical to that of FIG. 5, except that the washer 85 is formed with radially extending pressed ridges 105 that stiffen it. In FIGS. 25 and 26 the washer 85 has an outer periphery that is engaged under a snap ring 106 set in the groove 87.

I claim:

1. A drill chuck comprising:

a body centered on and rotatable about an axis and formed with an axially forwardly open tool-receiving recess, the body being further formed with a plurality of angled guides opening axially forward in the recess;

respective jaws axially and radially displaceable in the guides and each formed with a row of teeth;

a tightening ring axially fixed but rotatable about the axis on the body and having a screwthread meshing with the teeth, whereby rotation of the ring displaces the jaws in their guides;

an adjustment sleeve rotatable about the axis on the body and extending axially forward and rearward of the ring, the body having rearward of the tightening ring an outer surface directed toward an inner surface of the adjustment sleeve;

mechanism inside the adjustment sleeve coupling the adjustment sleeve to the tightening ring; and a support washer having an inner periphery axially fixed to the outer surface of the body and an outer periphery axially fixed to the inner surface of the adjustment sleeve, one of the peripheries being movable angularly relative to the respective surface and formed with a plurality of radially deflectable tabs.

2. The drill chuck defined in claim 1 wherein the body is further formed with an axially rearwardly open drive hole.

3. The drill chuck defined in claim 1 wherein the adjustment-sleeve inner surface is formed with radially inwardly open groove receiving the washer outer periphery.

4. The drill chuck defined in claim 1 wherein the chuck has a rear end and the washer is at the rear end, spaced rearward from the ring.

5. The drill chuck defined in claim 1 wherein the outer periphery of the washer is axially offset from the inner periphery.

6. The drill chuck defined in claim 1 wherein the one periphery is the outer periphery and the inner surface is formed with a radially inwardly open groove in which the tabs engage.

7. The drill chuck defined in claim 1 wherein the washer is formed with axially throughgoing apertures facilitating elastic deflection of the tabs.

8. The drill chuck defined in claim 1 wherein the inner surface is formed with a groove and the washer includes a snap ring set in the groove and axially engaging the outer periphery.

9. A drill chuck comprising:

a body centered on and rotatable about an axis and formed with an axially forwardly open tool-receiving recess, the body being further formed with a plurality of angled guides opening axially forward in the recess;

respective jaws axially and radially displaceable in the guides and each formed with a row of teeth;

a tightening ring axially fixed but rotatable about the axis on the body and having a screwthread meshing with the teeth, whereby rotation of the ring displaces the jaws in their guides;

an adjustment sleeve rotatable about the axis on the body and extending axially forward and rearward of the ring, the body having rearward of the tightening ring an outer surface directed toward an inner surface of the adjustment sleeve;

mechanism inside the adjustment sleeve coupling the adjustment sleeve to the tightening ring;

a support washer having an inner periphery axially fixed to the outer surface of the body and an outer periphery axially fixed to the inner surface of the adjustment sleeve, one of the peripheries being movable angularly relative to the respective surface; and means in the mechanism displaceable between an unlocked position permitting the adjustment sleeve to rotate in opposite directions about the axis relative to the body and a locked position preventing rotation of the adjustment sleeve in one of the directions relative to the body.

10. The drill chuck defined in claim 9 wherein the mechanism includes a cam formation on the adjustment sleeve displacing the means between the locked and unlocked positions.

11. The drill chuck defined in claim 10 wherein the adjustment sleeve is formed of metal of a uniform wall thickness, the adjustment sleeve being formed with inwardly directed bumps forming the cam formation.

12. The drill chuck defined in claim 9 wherein the means includes a coupling sleeve between the adjustment sleeve and the body;

formations angularly coupling the coupling sleeve to the adjustment sleeve;

a locking element angularly fixed to the coupling sleeve; and an array of teeth formed on the tightening ring and engageable with the locking element.

13. The drill chuck defined in claim 12 wherein the formations include an axially extending relatively narrow finger formed on the coupling sleeve and an axially open relatively wide notch formed on the adjustment sleeve and receiving the finger, the finger being angularly limitedly displaceable in the notch.

14. The drill chuck defined in claim 12 wherein the formations include an outwardly projecting spring-loaded bump on the coupling sleeve and an inwardly projecting bump on the adjustment sleeve angularly engageable and slidable past the coupling-sleeve bump.

15. The drill chuck defined in claim 14 wherein the means is in the locked position when the coupling-sleeve bump is to one side of the adjustment-sleeve bump and in the unlocked position when the coupling-sleeve bump is to an opposite side of the adjustment-sleeve bump.

16. The drill chuck defined in claim 15 wherein the formations include a spring element fixed angularly to the coupling sleeve and forming the coupling-sleeve bump.

17. The drill chuck defined in claim 15 wherein the means includes a spring element fixed angularly to the coupling sleeve and forming the locking element.

18. A drill chuck comprising:

a body centered on and rotatable about an axis and formed with an axially forwardly open tool-receiving recess, the body being further formed with a plurality of angled guides opening axially forward in the recess;

respective jaws axially and radially displaceable in the guides and each formed with a row of teeth;

a tightening ring axially fixed but rotatable about the axis on the body and having a screwthread meshing with the teeth, whereby rotation of the ring displaces the jaws in their guides;

an adjustment sleeve rotatable about the axis on the body and extending axially forward and rearward of the ring, the body having rearward of the tightening ring an outer surface directed toward an inner surface of the adjustment sleeve;

mechanism inside the adjustment sleeve coupling the adjustment sleeve to the tightening ring; and a support washer having an inner periphery axially fixed to the outer surface of the body and an outer periphery axially fixed to the inner surface of the adjustment sleeve, one of the peripheries being movable angularly relative to the respective surface, the washer being formed with radially extending stiffening ribs.

19. A drill chuck comprising:

a body centered on and rotatable about an axis and formed with an axially forwardly open tool-receiving recess, the body being further formed with a plurality of angled guides opening axially forward in the recess;

respective jaws axially and radially displaceable in the guides and each formed with a row of teeth;

a tightening ring axially fixed but rotatable about the axis on the body and having a screwthread meshing with the teeth, whereby rotation of the ring displaces the jaws in their guides;

an adjustment sleeve rotatable about the axis on the body and extending axially forward and rearward of the ring, the body having rearward of the tightening ring an outer surface directed toward an inner surface of the adjustment sleeve;

mechanism inside the adjustment sleeve coupling the adjustment sleeve to the tightening ring; and a support washer having an inner periphery axially fixed to the outer surface of the body and an outer periphery axially fixed to the inner surface of the adjustment sleeve, one of the peripheries being movable angularly relative to the respective surface, the outer periphery being formed with a plurality of axially forwardly projecting and independently radially deflectable tabs having ends forming the outer periphery.

* * * * *